Figure 1:
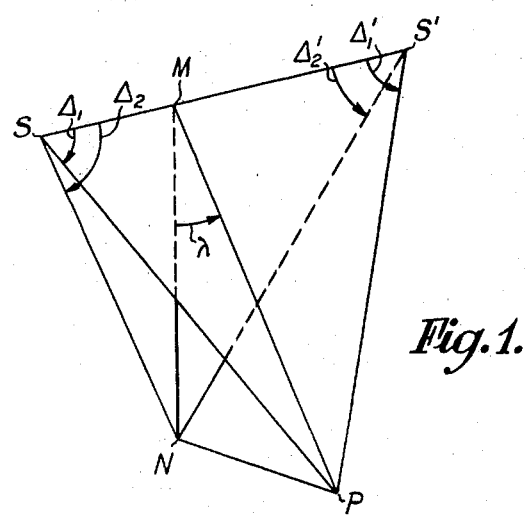

Dec. 9, 1958     E. H. THOMPSON     2,863,217
PHOTOGRAMMETRIC PLOTTER
Filed July 3, 1952     4 Sheets-Sheet 1

Inventor:
Edgar Hynes Thompson;
By his attorneys,
Baldwin & Wight

Dec. 9, 1958  E. H. THOMPSON  2,863,217
PHOTOGRAMMETRIC PLOTTER
Filed July 3, 1952  4 Sheets-Sheet 2

Inventor: Edgar Hynes Thompson;
By Baldwin & Wight, Attorneys

Dec. 9, 1958    E. H. THOMPSON    2,863,217
PHOTOGRAMMETRIC PLOTTER
Filed July 3, 1952    4 Sheets-Sheet 3

Inventor:
Edgar Hynes Thompson;
By Baldwin & Wight, Attys.

Dec. 9, 1958  E. H. THOMPSON  2,863,217
PHOTOGRAMMETRIC PLOTTER
Filed July 3, 1952  4 Sheets-Sheet 4

Inventor:
Edgar Hynes Thompson;
By his attorneys,
Baldwin & Wight

United States Patent Office 2,863,217
Patented Dec. 9, 1958

2,863,217

PHOTOGRAMMETRIC PLOTTER

Edgar H. Thompson, Ripley, England

Application July 3, 1952, Serial No. 297,153

Claims priority, application Great Britain July 6, 1951

11 Claims. (Cl. 33—20)

The invention comprises a new and simplified method and apparatus, preferably of the type utilising the Porro principle, for construction of maps from overlapping photographs. The invention is especially useful for the construction of maps from photographs taken from the air, but may also be used for constructing maps from photographs taken from the ground.

In this specification the terms listed hereunder are defined as follows:

(a) Overlapping photographs are a pair of photographs, each photograph being taken from a different point and showing an area which is, in part, shown on the other photograph.

(b) A projector is an optical apparatus adapted for the viewing of a photograph through an optical system similar to that of the camera used for taking the photographs.

(c) The Porro principle is the principle discovered by Porro and Koppe that a photograph may be used as a means of determining the directions, with respect to the direction of the optical axis of the camera which took the photograph at the time of exposure, of objects shown on the photograph. If the photograph is developed, and placed in a projector and illuminated, a parallel beam of light will be produced by the projector for every image on the photograph. The direction of any such beam of light with respect to the optical axis of the projector may be measured by a suitably mounted telescope; this direction will, of course, be the same as the direction which the beam of light from the object which produced the image made with respect to the optical axis of the camera at the time of exposure.

(d) The photographic base is the line joining the two points from which overlapping photographs are taken.

(e) A basal plane is any plane containing the photographic base.

(f) The polar axis of a photogrammetric plotter is that axis about which the projectors of the plotter rotate relatively to sighting means.

According to the invention, a method of determining the position of a point in space whose image is shown on overlapping photographs comprises determining the distance between the point and a pre-determined basal plane, and determining the projection of the point on the pre-determined basal plane. The point is preferably plotted by means of the Porro principle and the pre-determined basal plane is preferably the vertical basal plane.

The projection of the point may be determined by establishing the angles between the photographic base and the projections, on the pre-determined basal plane, of the lines joining the ends of the photographic base and the point.

Alternatively, the projection of the point may be determined by rabatting the lines joining the ends of the photographic base and the point onto the pre-determined basal plane, thereby establishing the rabatment of the point, and converting the said rabatment into the projection of the point by moving the said rabatment through a distance $$y \tan \frac{\lambda}{2}$$

wherein $y$ is the perpendicular distance of the point from the pre-determined basal plane and $\lambda$ is the angle between the pre-determined basal plane and the basal plane containing the point. The invention also comprises apparatus for carrying out the method described above.

Figure 4:
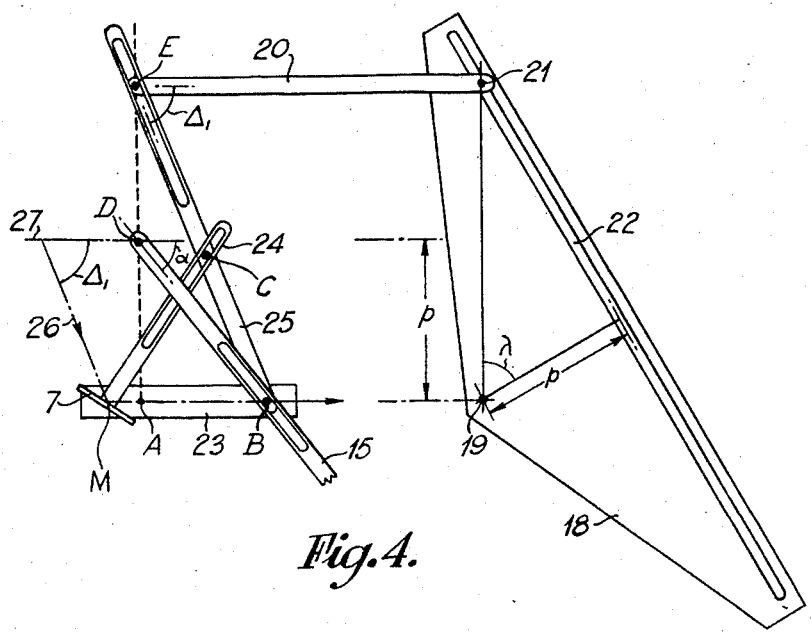
Figure 2:
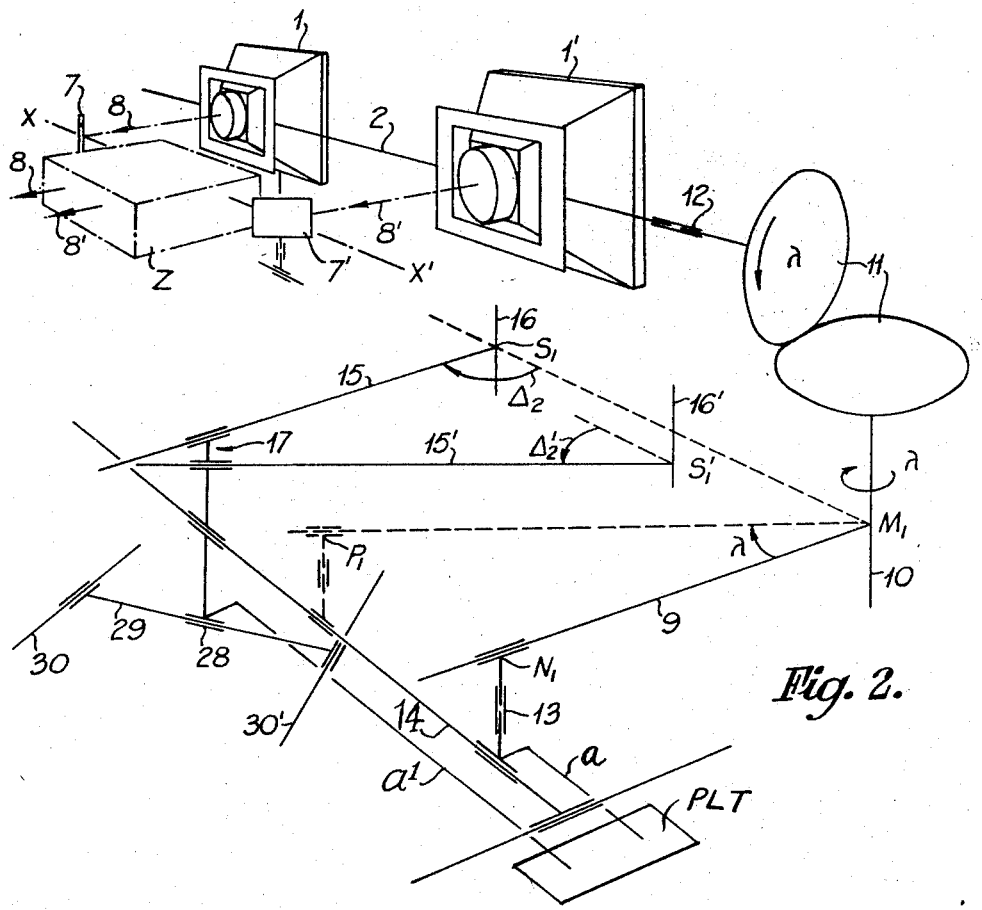
Figure 3:
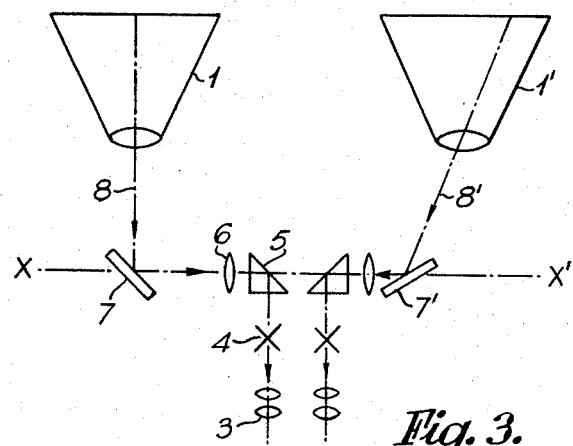
Figure 5:
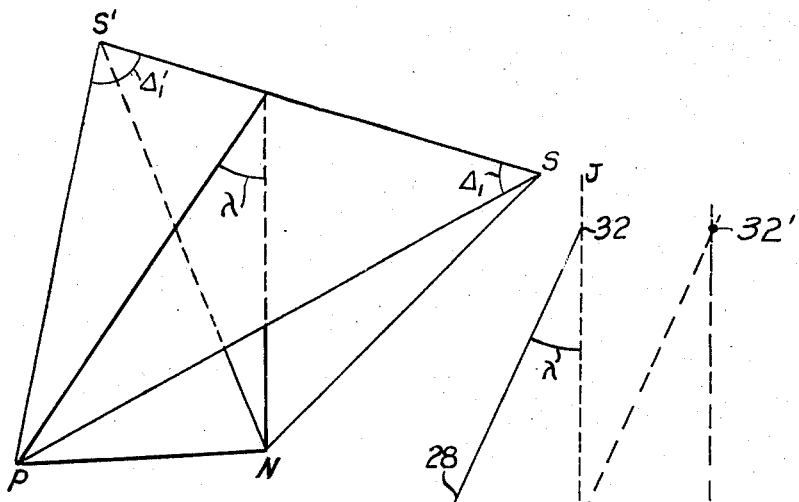
Figure 7:
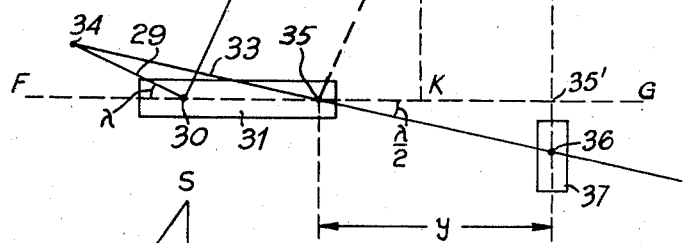
Figure 6:
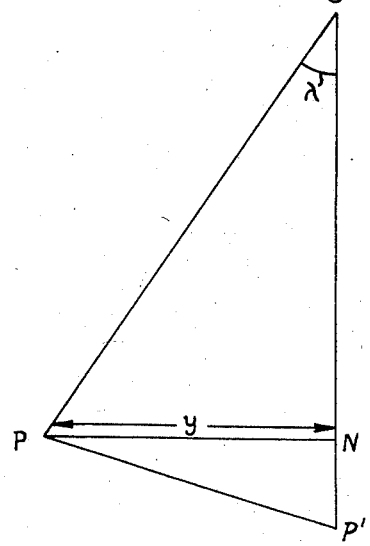
Figure 8:
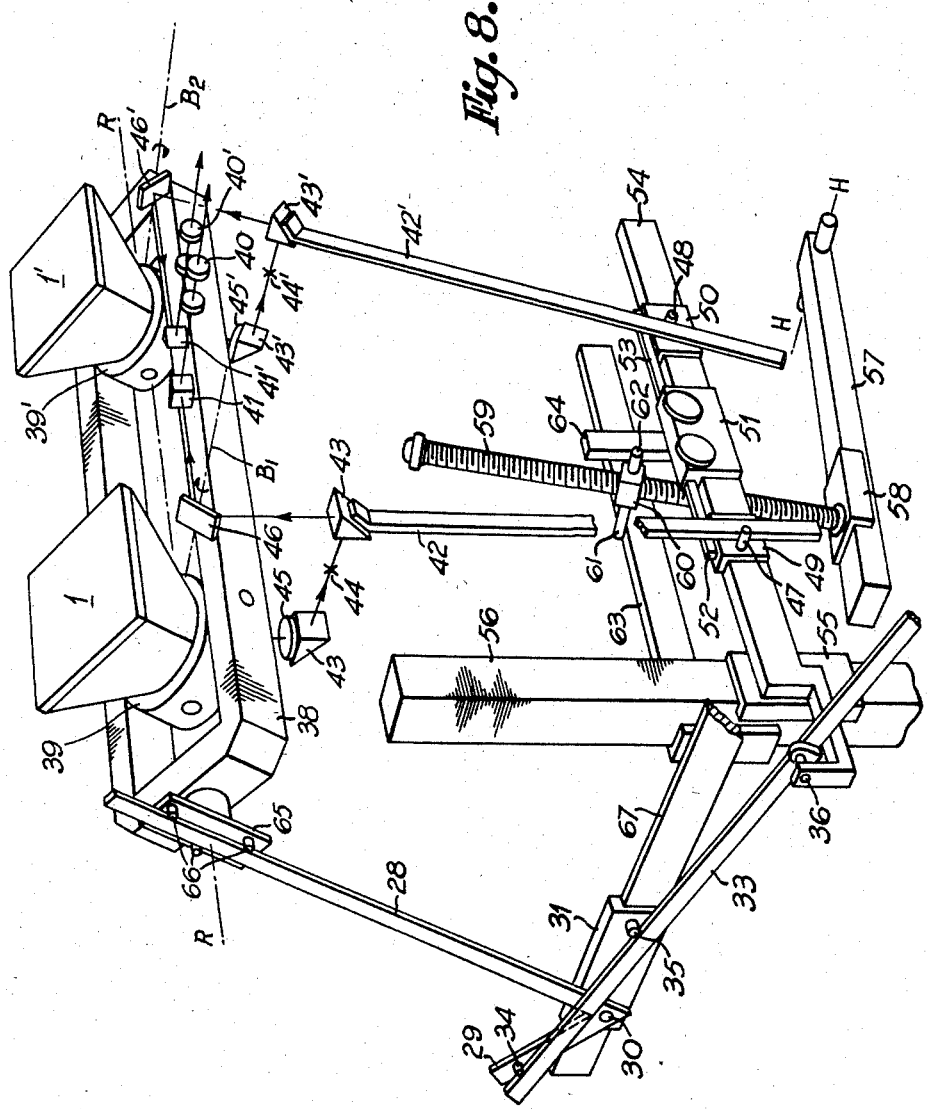

The invention is illustrated by way of example in the accompanying drawings in which Figures 1 to 4 illustrate one embodiment of the invention of Figures 5 to 8 illustrate a second, and preferred, embodiment of the invention. Figure 1 is a diagram illustrating the geometrical basis employed in the first embodiment; Figure 2 is a diagrammatic isometric view of a plotter employing the geometrical basis illustrated in Figure 1; and Figures 3 and 4 are diagrammatic views of a sighting means and link mechanism respectively used in connection with the plotter shown in Figure 2. Figure 5 is a diagram illustrating the geometrical basis employed in the preferred embodiment; Figure 6 is a side elevation of the view shown in Figure 5; Figure 7 is a diagram illustrating a means of converting a rabatment of a point onto a plane into the projection thereof, and Figure 8 is a diagrammatic isometric view of a plotter.

Referring to Figure 1, S, S' are two points from which photographs of a point P on the ground are taken. The lines SP, S'P make with the photographic base S, S' angles $\Delta_1$, $\Delta_1'$, respectively.

Consider a vertical plane containing the photographic base SS'. A line from P perpendicular to the vertical plane intersects the plane at a point N. From N a line perpendicular to the photographic base intersects the latter at a point M. The angle between the planes SS'P and SS'N is $\lambda$ and the angles between the photographic base and lines SN, S'N are $\Delta_2$ and $\Delta_2'$ respectively.

Then:

$$\frac{\tan \Delta_1}{\tan \Delta_2} = \frac{\frac{MP}{MS}}{\frac{MN}{MS}} = \frac{MP}{MN} = \sec \lambda$$

Similarly, $$\frac{\tan \Delta_1'}{\tan \Delta_2'} = \frac{\frac{MP}{MS'}}{\frac{MN}{MS'}} = \frac{MP}{MN} = \sec \lambda$$

Hence:

$$\frac{\tan \Delta_1}{\tan \Delta_2} = \frac{\tan \Delta_1'}{\tan \Delta_2'} = \sec \lambda$$

Thus, provided the points S, S' are known or can be deduced, the position of the point P will be defined if the angles $\lambda$, $\Delta_2$, $\Delta_2'$ can be determined. Moreover the proposition established in the last equation above will hold true even if the plane on to which SP, S'P are projected is not vertical, provided the said plane is a basal plane.

Hence a photogrammetric plotter will fix the position of the point P if it reproduces mechanically the two directions $\Delta_2$ and $\Delta_2'$, thus fixing N in the vertical or other predetermined basal plane, and if it reproduces $\lambda$, i.e., the direction of MP.

The apparatus shown in Figures 2-4 will now be described with reference to a plotter using photographs taken from the air. Two projectors 1, 1' are mounted on a beam 2 which is rotatable about the polar axis. The lenses of the two projectors lie approximately in the polar axis whose direction represents, in the instrument, the direction of the photographic base. The projectors 1, 1' are mounted on gimbals so that each projector can be tilted relative to the polar axis; but once these tilts have been applied, a rotation of the beam 2 moves both projectors together as a single unit about the polar axis. The projectors 1, 1' have lenses similar to or identical with the lenses used in the cameras which took overlapping photographs and one of these photographs is mounted in each of the projectors and is illuminated from behind by means not shown.

The photographs are sighted through two adjacent fixed telescopes (Figure 3) each comprising an eyepiece 3, a mark 4, a prism 5 and an objective 6. This sighting means is shown diagrammatically in Figure 2 at Z. Light is directed into the two fixed telescopes by way of mirrors 7, 7'. The collimation axes of the two telescopes lie in a plane containing the polar axis. Alternatively, the collimation axes may lie in a plane parallel to the polar axis. The two mirrors 7, 7' are rotatable about axes perpendicular to this plane and are adapted to have linear movements parallel to the polar axis— i. e., along the line XX' in Figure 2. It should be clear from this description that sighting takes place always in the basal plane of the point whose images are being observed. Points lying in different basal planes are sighted by rotating the two projectors through the appropriate angle about the polar axis; different points lying in a given basal plane are examined by translating and rotating the mirrors 7, 7'. The angles through which the projectors rotate about the polar axis represent changes in the angle λ of Figure 1. The procedure is evidently equivalent to holding the projectors fixed and rotating the double telescopic system about the polar axis.

The angles between the lines of sight 8, 8' and the polar axis when the two images of the point P (Figure 1) are being sighted are respectively the $\Delta_1$ and $\Delta_1'$ of Figure 1.

A link 9 is adapted to rotate about a link 10 perpendicular to and intersecting the polar axis. The link 10 is coupled to the beam 2 in such a way that rotations of the projectors about the polar axis are followed by equal rotations of the link 9. The coupling of the link 10 to the beam 2 is adjustable for reasons hereinafter set forth. A simplified representation of such a coupling is shown in Figure 2 as comprising a pair of bevel wheels 11 adjustably coupled to the beam 2 by an adjustable coupling 12. It will be appreciated, of course, that the actual coupling used should obviate backlash. The free end of the link 9 passes through a slide 13 which is itself carried on a bridge 14. The latter can move towards or away from the link 10 while remaining exactly parallel to the polar axis. As will hereinafter appear, the slide 13 is used for deriving the "y" co-ordinate of a point being plotted, while the bridge 14 is used for deriving the "z" (or height) co-ordinate.

Suppose the link 9 set perpendicular to the bridge 14 and the latter placed so that the distance of the slide 13 from the link 10 is equal to the distance MN in Figure 1 (at, of course, some very reduced scale) so that $M_1N_1$ in Figure 2 is the scale equivalent of MN in Figure 1. If now the link 9 is rotated through the angle λ of Figure 1 the slide 13 will move to $P_1$ whereby the distance $N_1P_1$ will clearly be the scale equivalent of NP in Figure 1. By virtue of the adjustable coupling 12 it is possible to ensure that when the link 9 is perpendicular to the bridge 14 images in the vertical basal plane are sighted. This setting is, of course, made once and for all for any one set of overlapping photographs.

The distance PN in Figure 1 is perpendicular to the vertical basal plane and is therefore a horizontal distance even if the photographic base is inclined to the horizontal. The movement of the slide 13 along the bridge 14 can thus be directly transferred to one of the movements of a pencil (not shown) in a rectangular co-ordinatograph, or the movement of the slide 13 can be read from a scale (not shown) carried on the bridge 14. Thus when the apparatus shown in Fig. 2 is so adjusted that a point shown on both overlapping photographs may be sighted through both projectors, the position of the slide 13 gives the "y" co-ordinate of the said point.

Two links 15 and 15' are adapted to rotate about links 16, 16' which are parallel to the link 10, and are in the plane of the polar axis. The distance apart of the links 16, 16' represents in the instrument the length of the photographic base SS' in Figure 1. The links 15, 15' intersect in a slide 17 mounted on the bridge 14. As will hereinafter appear, the slide 17 is used for deriving the "x" co-ordinate of a point being plotted. The links 15, 15' represent in the instrument the projected directions SN and S'N in Figure 1. They are connected to the mirrors 7, 7' by a link mechanism to be hereinafter described, which ensures that when a point is sighted in a basal plane which is at an angle λ to the vertical basal plane, the lines of sight making angles $\Delta_1$, and $\Delta_1'$ with the polar axis, the projections of the links 15, 15' on a plane through the polar axis and parallel to both links, make angles $\Delta_2$ and $\Delta_2'$ with the polar axis, the angles being connected by the relationship given above. The triangle formed by 16, 16' and 17 will thus be similar to the triangle SS' in Figure 1, and therefore not only will the slide 17 represent the position of N in this plane at the reduced scale, but the bridge 14 will be constrained to be the correct (scale) distance from the polar axis. Thus when the apparatus shown in Fig. 2 is so adjusted that a point shown on both overlapping photographs may be sighted through both projectors, the position of the slide 17 on bridge 14 gives the "x" co-ordinate of the said point, while the position of the bridge 14 on the base gives the "z" co-ordinate.

A link mechanism illustrative of the mathematical principles involved is shown in Figure 4. A plate 18 is pivoted at 19, the pivot 19 being the same perpendicular distance from the polar axis here indicated as the line 27, as is the axis of the mirror 7. A link 20 has a pin 21 disposed at one of its ends, the pin 21 riding in a slot 22 in the plate 18. The link 20 is so mounted that it remains always parallel to, and may move towards or away from, the polar axis. The link 20 is mounted on some common form of cross-slide which serves to constrain the link 20 to lie parallel to the polar axis and have no end movement.

In Figure 4, the plate 18 is shown in a position where it has been turned in accordance with rotation of link 9 (see also Figure 2) through an angle λ from a normal position in which the slot 22 is parallel to the polar axis. The distance of the pin 21 from the pivot 19 is then $p \sec \lambda$ where $p$ is the perpendicular distance of the pivot from the slot.

The mirror 7 is mounted on a slide 23 constrained to move parallel to the polar axis. A link 24 is secured perpendicular to the mirror 7 at a point M on the axis thereof. To a pivotal point B on the slide 23 is pivoted a link 25 which is slidably pivoted to link 20 at E. The link 24 is slidably pivoted to the link element 25 at C, the distance BC being equal to the distance MB. The link 15 is slidably pivoted at B and is pivoted to a fixed point D lying on a line AE perpendicular to the polar axis, the line AE intersecting MB at A. The distance AD is equal to $p$. The point D is shown lying on the line of the polar axis 27 but may be slightly displaced therefrom.

It will readily be seen from geometrical considerations that whatever be the value of λ the link 25 is always parallel to the line of sight 26. The angle between the line of sight 26 and the polar axis 27 is $\Delta_1$. Hence the angle between the link 25 and MB is $\Delta_1$.

Since the link 20 is parallel to the slide 23, the distance $AE$ = the distance of the pin 21 from the pivot 19 = $p \sec \lambda$.

Let the angle between the arm 15 and the polar axis 27 (or a line parallel to the polar axis) be $\alpha$. Then $$\tan \Delta_1 = \frac{EA}{AB} = \frac{p \sec \lambda}{AB}$$

$$\tan \alpha = \frac{DA}{AB} = \frac{p}{AB}$$

Hence $$\frac{\tan \Delta_1}{\tan \alpha} = \sec \lambda$$

But $$\frac{\tan \Delta_1}{\tan \Delta_2} = \sec \lambda$$

Hence $\alpha$ = the required angle $\Delta_2$.

Hence if the plate 18 is so coupled to the beam 2 as to be moved through the angle $\lambda$ when the beam moves through this angle, then when the mirror 7 is so disposed that an image on the respective photograph is sighted, the arm 15 will make an angle $\Delta_2$ with the polar axis.

Reverting to Figures 2 and 3, the movements of the slide 17 and the bridge 14 do not give true horizontal and vertical co-ordinates if the photographic base is inclined to the horizontal. A subsidiary slide 28 is therefore attached to the slide 17 and is carried on a bridge 29. The latter is supported on rails 30, 30' which can be rotated so that the bridge 29 makes an angle with the bridge 14 equal to the inclination of the photographic base to the horizontal. Movement of the slide 28 along the bridge 29 is then a horizontal movement and is connected to the second pencil movement on the coordinatograph. Alternatively, the movement of the slide 28 along the bridge may be measured on a scale. Heights may be measured by a scale indicating the relative movement of the bridge 29 and the rail 30.

The instrument may be adapted for use with photographs taken from the ground by connecting the slide 13 to another slide carried on the bridge 28.

The said apparatus, on the contrary, utilises projection onto a basal plane and this has the advantage that the number of arms and link mechanism is reduced. The mounting of the projectors on a common beam further simplifies the construction and increases the accuracy of the machine, while the setting up of the projectors for plotting is not affected by the accuracy of the plotting mechanism since the projectors and the mirrors are adapted to rotate independently of the rest of the machine.

As indicated diagrammatically in Figure 2, the slides 17 and 13 are connected to plotting mechanism PLT, such as a conventional plotting table, by articulators $a$ and $a^1$ respectively, the articulator $a^1$ being connected to the slide 17 through the intermediary of the auxiliary slide 28 which is attached to the slide 17.

A second, and preferred embodiment of the invention is illustrated in Figures 5–8. Referring to Figure 5, S, S' are two points from which photographs of a point P on the ground are taken. The lines SP, S'P make, with the photographic base SS' angles $\Delta_1$, $\Delta_1'$ respectively.

Consider a vertical basal plane i. e. a vertical plane containing the photographic base SS'. A line from P perpendicular to the vertical plane intersects the plane at a point N. The angle between the planes SS'P and SS'N is $\lambda$.

In Figure 6 there is shown a side elevation of the view of Figure 5, the perpendicular distance of P from the vertical basal plane being $y$. If the plane SS'P is swung down, i. e., rabatted onto the vertical plane, P' will represent the rabatment of P, and SP' will equal SP. Then $\angle SP'P = \angle P'PS = \angle \frac{1}{2}(180° - \lambda)$. But NPP' is a right angled triangle and since $\angle NP'P = \frac{1}{2}(180° - \lambda)$, $$NPP' = 90° - [\tfrac{1}{2}(180° - \lambda)] = 90° - \left[90° - \frac{\lambda}{2}\right]$$
$$= \frac{\lambda}{2}$$

Hence $$\tan \frac{\lambda}{2} = \frac{NP'}{y}$$

and thus $$NP' = y \tan \frac{\lambda}{2}$$

Hence the distance separating the rabatment of P on the vertical basal plane from the projection of P thereon is $$y \tan \frac{\lambda}{2}$$

where $\lambda$ is the angle between the vertical basal plane and the basal plane containing P, and $y$ is the perpendicular distance of P from the vertical basal plane. It will be appreciated that the rabatment of P on any predetermined basal plane will be displaced from its projection thereon by the distance $$y \tan \frac{\lambda}{2}$$

whether the predetermined basal plane is vertical or otherwise.

It will be clear from the above that the position of any point shown on overlapping photographs may be plotted provided the position of the rabatment of P on a predetermined basal plane is known or can be deduced, that the values of $y$ and $\lambda$ are discoverable, and that means are provided for converting the rabatment into the projection—i. e., in moving the point P' through a distance $$y \tan \frac{\lambda}{2}$$

to N.

Figure 7 illustrates diagrammatically one method of converting the rabatment into the projection. A bell crank lever 28, 29 is pivoted at 30 to a movable carriage 31, the arms 28, 29 of the bell crank lever lying at right angles to each other. The carriage 31 is translatable in the horizontal plane along a line FG. The arm 28 of the bell crank lever is slidably pivoted at a point 32 remote from the pivot point 30 so that the arm 28 may be swung through an angle $\lambda$ from a normal position in which it is disposed in the vertical plane. A lever 33 is slidably pivoted to the arm 29 at 34 and is slidably pivoted to the carriage 31 at a point 35 which is the same distance from the point 30 as is the pivot point 34. The pivot points 34, 35 are disposed on opposite sides of the point 30.

The lever 33 is also pivoted at a point 36 on a carriage 37 movable in the vertical plane. The point 36 coincides with the position 35' which is assumed by the point 35 when the arm 28 is disposed vertically.

The figure shows the arm 28 disposed at an angle $\lambda$ to a vertical plane JK passing through the point 32. If the point 30 represents the position of the point P of Figures 5 and 6 it is clear that the distance separating the point 30 from the plane JK is $y$. Hence the distance separating 35 from 35' is also $y$.

Since the planes FG, JK are perpendicular to each other and since the arms 28, 29 are also perpendicular to each other, the angle between the arm 29 and FG is $\lambda$. Since, however, the points 34 and 35 are equidistant from the point 30, the triangle 30, 34, 35 is an isosceles triangle and the angle $\angle 34, 35, 30$ is therefore $$\frac{\lambda}{2}$$

Hence the angle $\angle 35', 35, 36$ is also $$\frac{\lambda}{2}$$

Hence the triangles 35, 35', 36 and PNP' are right angled triangles having an additional angle equal. They are therefore equal triangles so that the distance 35'—36 is equal to P'N, i. e., to $y \tan \lambda/2$. Moreover, if, through 35, a line 35—32' is drawn parallel to 32—30 to intersect the line 36—35' at 32', then the triangle 32', 35, 36 will be equal to the triangle SPP'. It is clear therefore that 35 may be considered as representing P, and 36 as representing its rabatment P' from which it follows that 35' represents N, the projection of P.

Figure 8 illustrates a photogrammetric plotter embodying the geometrical principles described with reference to Figures 5-7. Two projectors 1, 1' are mounted on a polar frame 38 which is mounted to rotate about the polar axis RR. The lenses of the projectors lie approximately in the polar axis whose direction represents, in the instrument, the direction of the photographic base. The projectors 1, 1' are mounted on gimbals 39, 39' so that each projector can be tilted relative to the polar axis or relative to the other projector. Once, however, these tilts have been applied, rotation of the polar frame 38 moves both projectors together as a single unit about the polar axis RR. The projectors 1, 1' have lenses similar to or identical with the lenses in the camera which took overlapping photographs and one of these photographs is mounted in each of the projectors and is illuminated from behind by means not shown.

The photographs are sighted through two adjacent fixed telescopes comprising eyepieces 40, 40' and prisms 41, 41', different points lying in a given basal plane being sighted by movement of links 42, 42' which lie in the vertical basal plane. The links 42, 42' are coupled to pairs of prisms 43, 43', marks 44, 44', objectives 45, 45' and mirrors 46, 46'. The link 42 is adapted to rotate about an axis $B_1$ normal to the polar axis, the the axis of the mirror 46 coinciding with the axis $B_1$ the mirror 46 being rotated at one half the angular speed of the link 42 by any suitable means (not shown). Similarly, the link 42' is adapted to rotate about an axis $B_2$ normal to the polar axis, the axis of the mirror 46' coinciding with the axis $B_2$, the mirror 46' rotating at one half the angular speed of the link 42'. As will be appreciated from the drawing, light from the projector 1 is focussed by the objective 45 onto the mark 44 through a prism 43, is reflected by a prism 43, the mirror 46, and the prism 41 into the eyepiece 40. Thus movement of the link 42 will enable different points to be sighted on the photograph in the projector 1, all the said points lying in a given basal plane. A similar optical system is, as will be appreciated, provided for the projector 1'.

The links 42, 42' are constrained (by means not shown) to lie in contact with pins or rollers 47, 48 disposed on outer carriages 49, 50 respectively. The carriages 49, 50 are coupled to a central carriage 51 by means of spacing rods 52, 53 respectively. The effective length of each of the spacing rods is adjustable independently of the other spacing rod. The carriages 49, 50, 51 together constitute a base carriage which is movable along a range bridge arm 54, the range bridge being disposed parallel to the polar axis and being movable perpendicularly to the machine datum plane, i. e., the plane containing the polar axis and the axes $B_1$, $B_2$. (In the following description this datum plane is assumed to be horizontal.) The range bridge 54 is carried by a sleeve 55 which is slidably mounted on an upstanding pillar 56.

A ground frame 57 is disposed beneath the range bridge 54 and is mounted so as to be rotatable about an axis HH which is disposed perpendicular to the polar axis and parallel to the machine datum plane. The ground frame 57 is shown in the drawing as having a slight tilt to compensate for a corresponding tilt in the photographic base with respect to the horizontal. A carriage 58 is slidably mounted on the ground frame 57 and is actuated by a screw mounted on the ground frame (not shown) which is in turn connected to a mechanism (not shown) for plotting the "$x$" co-ordinate of a point to be plotted (e. g. the point P). A height screw 59, calibrated to measure height, on the carriage 58 carries a nut 60 which is provided with co-axial pins or rollers 61, 62 disposed on opposite sides of the nut. The pin or roller 61 is constrained (by means not shown) to lie in contact with an arm 63 which is slidably mounted on the pillar 56. The pin or roller 62 is constrained (by means not shown) to lie in contact with an upstanding straight edge 64 carried by the carriage 51, and disposed vertically.

The polar frame 38 carries a bracket 65 which is provided with three pins or rollers 66. The position of the bracket 65, relative to the polar axis is adjustable. A pivoted link or bell crank lever 28, 29 whose arm 28 is maintained in slidable contact with the pins or rollers 66 is pivoted at 30 to a carriage 31 which is connected to a mechanism (not shown) for plotting the "$y$" co-ordinate of the point to be plotted. The carriage 31 is slidably mounted on an arm or strut 67 secured to the arm 63 and lying at right angles thereto, the two arms 63, 67 constituting a second bridge. The arm 67 is disposed perpendicular to the polar axis and the second bridge as a whole is movable in the vertical plane.

The arms 28, 29 are disposed at right angles to each other and the arm 29 carries a pin or roller 34 which is the same distance from the pivot point 30 as is a pin or roller 35 carried by the carriage 31, the pins or rollers 34, 35 being disposed on opposite sides of the pivot point 30. A pivoted link or lever 33 is constrained to lie in slidable contact with the pins or rollers 34, 35 and is pivoted at 36 to the range bridge 54. The construction and arrangement is such that when the arm 28 is disposed vertically (i. e. when the carriage 31 is in its "zero" position) the pin or roller 35 and the pivot 36 are co-axial. The pins or rollers 47 and 48 and the pivot 36 all lie at the same distance from the machine datum plane.

It will be appreciated that the position of the carriage 58 on the ground frame 57 together with the position of the nut 60 on the screw 59 will determine the distance of the arm 63 from the machine datum plane and will determine also the position of the carriages 49, 50, 51 on the range bridge 54.

In effect co-ordinates measured parallel and perpendicular to the ground frame 57, by movement of the carriage 58 and nut 60 respectively, are transformed to co-ordinates measured parallel and perpendicular to the machine datum plane by movement of the arm 63 and of the carriages 49, 50, 51 respectively and vice versa. The movement of the common axis of the pins 61, 62 then represents at a reduced scale the movement of the point N in the vertical basal plane.

I claim:

1. Apparatus for using a pair of photographs to determine the position of a point in space, each photograph being taken from a different position in space and an image of the said point appearing on each photograph: the said apparatus comprising a pair of projectors adapted to receive the said photographs and to rotate as a unit about a common axis; sighting means for viewing the said image on the photographs within the projectors; a link coupled to the projectors so as to receive a movement dependent upon the angle through which the projectors have to be rotated in order to sight the image;

plotting mechanism connected to the link; and a pair of links connected to the plotting mechanism and coupled to the sighting means in such a way that, when the image is sighted, the tangents of the angles between the pair of links and lines through the links parallel to the common axis of the projectors are always equal, respectively, to the products of the tangents of the angles between the respective lines of sight and the said common axis and the cosine of the angle between a selected basal plane and a basal plane containing the said point and the positions from which the photographs were taken.

2. Apparatus as claimed in claim 1 comprising a member common to both projectors and being mounted for rotation about said common axis, each projector being pivotally mounted in the member so that the projector may be tilted, independently of the other projector, with respect to the said common axis.

3. Apparatus as claimed in claim 2 in which the sighting means comprises a pair of fixed telescopes and a mirror for each telescope, each mirror being adapted to direct light into its telescope and to receive light from its respective projector, and each mirror being movable parallel to the axis of rotation of the rotatably mounted member and rotatable about its axis perpendicularly to its direction of movement.

4. Apparatus as claimed in claim 11 comprising a slide for each mirror movable parallel to the said common axis a pair of link elements each of which is pivoted to one of the slides at a point on a line parallel to the said common axis and passing through the axis of the said mirror; means constraining each said link element to lie parallel to the line of sight between the respective projector and the mirror; a pair of slidably pivoted members each of which is slidably pivoted to one of said link elements, which is adapted to move towards or away from the said common axis while remaining always parallel thereto; and means for maintaining the perpendicular distance of each such slidably pivoted member from its respective mirror proportional to the secant of the angle between the selected plane and a plane containing the said point and the said positions from which the photographs were taken, one link of said pair of links being connected to the plotting mechanism and pivoted substantially at the intersection of the said common axis with the normal from said common axis to the point at which the slidably pivoted member is slidably pivoted to the link element, said one link of said pair of links being slidably pivoted to the slide at the pivot point of the link element to the slide.

5. Apparatus as claimed in claim 4 in which said perpendicular distance maintaining means comprises a plate pivoted at a point lying on the said line passing through the axis of the mirror; a straight slot in the plate disposed at a perpendicular distance from the pivot point of the plate equal to the distance of the said line from the axis of the rotatably mounted member; a pin disposed on the member which is slidably pivoted to the link element, the pin being adapted to slide in the slot; and means for rotating the plate through the angle through which the projectors have been rotated about the axis of the rotatably mounted member in order to sight the image.

6. Apparatus for using a pair of photographs to determine the position of a point in space, the photographs being taken from opposite ends of a photographic base, and an image of the said point appearing on each photograph; the said apparatus comprising a pair of projectors adapted to receive the said photographs and to rotate about a common axis representing the said photographic base; sighting means for viewing the said image on the photographs within the projectors; means for rotating the projectors about the said axis so as to establish the angle between a plane passing through said axis and corresponding to the basal plane containing the point and a further plane passing through said axis and corresponding to a predetermined basal plane; and means connected to the sighting means, for establishing a point representing the projection of the said image on the plane representing the predetermined basal plane.

7. Apparatus for using a pair of photographs to determine the position of a point in space, the photographs being taken from opposite ends of a photographic base, and an image of the said point appearing on each photograph; the said apparatus comprising a pair of projectors adapted to receive the said photographs and to rotate about a common axis representing the said photographic base; sighting means for viewing the said image on the photographs within the projectors; means for rotating the projectors about the said axis so as to establish the angle (hereinafter called the angle λ) between a plane passing through said axis and corresponding to the basal plane containing the point and a further plane passing through said axis and corresponding to a predetermined basal plane; and means connected to the sighting means for establishing the rabatment of the point on the said predetermined basal plane and for converting the said rabatment into the projection of the point by establishing a point displaced from the rabatment of said point by a distance $$y \tan \frac{\lambda}{2}$$

wherein $y$ is the perpendicular distance of the point from the predetermined basal plane.

8. Apparatus for using a pair of photographs to determine the position of a point in space, the photographs being taken from opposite ends of a photographic base, and an image of the said point appearing on each photograph; the said apparatus comprising a pair of projectors adapted to receive the said photographs and to rotate about a common horizontal axis representing the said photographic base; sighting means for viewing the said image on the photographs within the projectors; a link coupled to the projectors so as to receive a movement dependent upon the angle (hereinafter called the angle λ) through which the projectors have to be rotated in order to sight an image of the point common to both photographs; a pair of links coupled to the sighting means and lying in a vertical plane parallel to the said axis, said vertical plane representing the vertical basal plane; a first member pivotally and slidably connected to the first-mentioned link; a second member pivotally and slidably connected to the pair of links; and means interconnecting the two members so as to separate the vertical component of their projections on the basal plane by a distance $$y \tan \frac{\lambda}{2}$$

wherein $y$ is a distance representing the perpendicular distance of the point from the vertical basal plane.

9. Apparatus as claimed in claim 8 comprising a common rotatably mounted member for both projectors; and means for pivotally mounting each projector so that the projector may be tilted, independently of the other projector, relative to the axis of the said member.

10. Apparatus as claimed in claim 9 in which the first member is a first carriage and the second member is a second carriage; and in which the first-mentioned link comprises a bell crank lever, a pivotal mounting for said bell crank lever being provided on the first carriage, and the arms of the bell crank lever being disposed at right angles to each other; the apparatus also comprising a vertically movable horizontal strut disposed beneath and perpendicular to the said axis, the first carriage being slidable on said strut; a link slidably pivoted to one of the arms of the bell crank lever and to the first carriage at points equidistant from the said pivotal mounting and lying on opposite sides thereof; a vertically movable arm pivotally connected to the last-mentioned link and disposed parallel to the axis of the projectors, the second carriage being carried by the said arm, the pivotal connection of the last-mentioned arm to the last-mentioned link being co-axial with the said pivotal mounting on the first carriage when the point to be plotted lies in the vertical basal plane.

11. Apparatus as claimed in claim 10 comprising a ground frame pivoted to rotate about an axis perpendicular to the axis of the projectors; a third carriage movable along the ground frame; an upstanding height screw carried by the third carriage; a nut carried by the height screw; a pair of co-axial rollers on the nut; an upstanding straight edge carried by the second carriage; an arm horizontally disposed perpendicular to the said strut and secured thereto, one of the said rollers lying permanently in contact with the straight edge and the other roller lying permanently in contact with the last-mentioned arm.

References Cited in the file of this patent

UNITED STATES PATENTS

| | | |
|---|---|---|
| 1,504,384 | Schneider | Aug. 12, 1924 |
| 1,676,708 | Poivilliers | July 10, 1928 |
| 1,713,498 | Cooke | May 14, 1929 |
| 2,492,870 | Kelsh | Dec. 27, 1949 |